United States Patent [19]

Politi

[11] Patent Number: 5,058,786
[45] Date of Patent: Oct. 22, 1991

[54] PORTABLE LOAD SECURING DEVICE

[76] Inventor: Albert H. Politi, 66 Planters Row, Hilton Head Island, S.C. 29928

[21] Appl. No.: 529,214

[22] Filed: May 25, 1990

[51] Int. Cl.[5] ............................................. B60R 11/00
[52] U.S. Cl. .................................. 224/42.32; 224/318; 224/324; 410/97
[58] Field of Search ................... 224/42.32, 42.42, 275, 224/42.38, 42.39, 328, 318, 324; 296/100; 206/597; 211/181; 52/3, 4, 5; 410/96, 97, 117

[56] References Cited

U.S. PATENT DOCUMENTS

| | | | |
|---|---|---|---|
| 1,346,581 | 7/1920 | Yost | 224/42.44 |
| 2,696,360 | 12/1954 | Toffolon | 410/97 |
| 2,705,461 | 4/1955 | Campbell . | |
| 2,808,290 | 10/1957 | Nelson . | |
| 3,170,611 | 2/1965 | Gullen . | |
| 3,173,539 | 3/1965 | Looker | 410/97 |
| 3,312,181 | 4/1967 | Davidson | 410/97 |
| 3,912,139 | 10/1975 | Bowman | 224/42.45 R |
| 3,961,585 | 6/1976 | Brewer | 410/97 |
| 4,270,657 | 6/1981 | Bayon | 206/597 |
| 4,369,009 | 1/1983 | Fulford . | |
| 4,655,376 | 4/1987 | Darling | 224/324 |
| 4,900,204 | 2/1990 | Summers | 410/97 |

FOREIGN PATENT DOCUMENTS

| | | | |
|---|---|---|---|
| 2536733 | 3/1977 | Fed. Rep. of Germany . | |
| 2938357 | 4/1981 | Fed. Rep. of Germany | 224/275 |
| 1073614 | 9/1954 | France | 224/328 |
| 1345149 | 10/1963 | France | 224/328 |
| 2376013 | 7/1978 | France | 224/324 |
| 223680 | 6/1985 | German Democratic Rep. | 410/97 |
| 2196907 | 5/1988 | United Kingdom | 410/96 |

Primary Examiner—Linda J. Sholl
Attorney, Agent, or Firm—William P. Keegan

[57] ABSTRACT

A portable device for securing loads, including a plurality of articles, in motor vehicles, which device comprises a platform means having hook-like mesh engaging elements provided along one edge thereof, and net means secured along the opposite edge of said platform means so that meshes of said net are engaged by said hook-like elements when said net is pulled taut over articles placed on said platform means.

10 Claims, 3 Drawing Sheets

PORTABLE LOAD SECURING DEVICE

FIELD OF THE INVENTION

The invention relates to a portable load securing device, and more particularly to a pallet with an integral means for securing multiple small articles, such as grocery packages or the like, when transporting such articles in the trunk or On the r®ar seat of a passenger vehicle, or on the floor of a van or truck.

BACKGROUND OF THE INVENTION

Load securing devices for vehicles are well known in the art. They range from cargo nets that attach to fixtures provided on the vehicle itself to nets, tarpaulins, and tie down devices for securing luggage or other articles to vehicle roof racks or carriers. Thus, United Kingdom Patent No. 2196907 discloses a net resiliently connected at its corners to hooks which in turn attach to fixtures provided at desired locations in the vehicle. U.S. Pat. No. 2,705,461 discloses a similar cargo net. U.S. Pat. Nos. 4,369,009 and 4,655,376 disclose tie down devices for tightening a belt or rope over articles placed on a vehicle roof rack. U.S. Pat. No. 3,170,611 and French Patent No. 1.345.149 and German (West) Patent No. 2536733 disclose means for attaching a luggage securing net to a rack mounted on a vehicle roof. U.S. Pat. No. 2,808,290 and French Patent No. 1.073.614 disclose devices in which one end of a load securing tarpaulin or cover is anchored on a vehicle (or roof rack) while the free end is attached to another part of the vehicle or roof rack. German (East) Patent No. 233 680 discloses a load securing net that is attached to a load carrying pallet by resilient bands or cables.

GENERAL DESCRIPTION OF THE INVENTION

It is often necessary to carry a number of small packages or articles, e.g., bags of groceries, in the trunk of a passenger vehicle, some of which are fragile and susceptible to breakage or spillage if overturned or collided with one another, but it is difficult to secure such packages and prevent inadvertent movement that could lead to damage to the contents of the packages. The present invention is intended to obviate the problem just mentioned by providing a portable pallet with integral means for securing articles thereon.

An object of the invention is to provide an improved load securing device.

Another object of the invention is to provide a self contained device that will secure a number of articles as a single unit.

Still another object of the invention is to provide a portable device that will facilitate securing an article against inadvertent movement when transporting the article in a motor vehicle.

In carrying out the invention, a pallet is provided with a net attached to one edge thereof. The net will be longer than the adjacent edges of the pallet so that it will fit over articles that may be placed on the pallet and reach the edge of the pallet opposite the edge to which the net is anchored where, after being pulled taut, the net is held taut by engaging the meshes of the net with hook-like elements provided along the attaching edge. The device is portable and may be placed in the trunk or on the rear seat of a passenger vehicle, or on the floor of a van or a truck.

Features and advantages of the invention may be gained from the foregoing and from the description of a preferred embodiment thereof which follows.

DETAILED DESCRIPTION OF THE INVENTION

Figure 1:
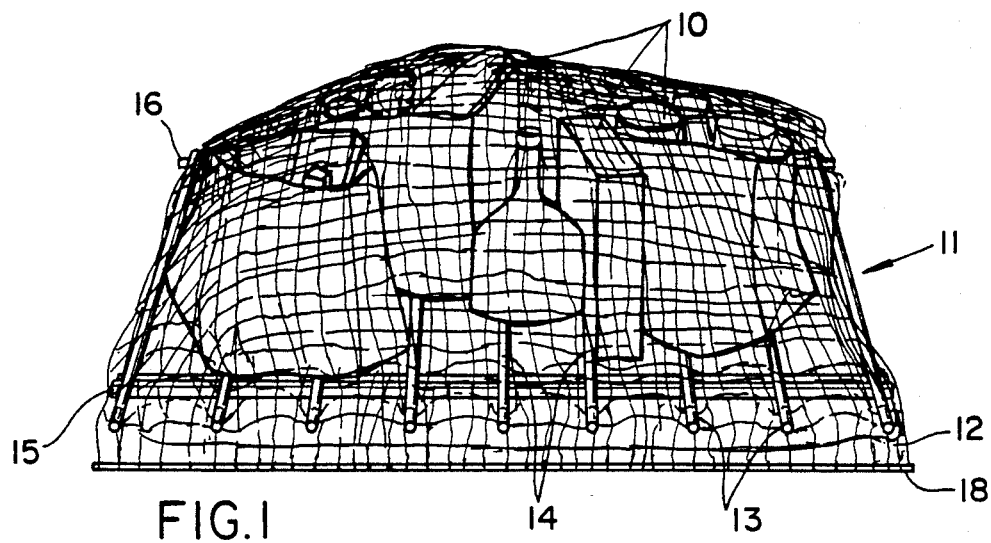
FIG. 1 is a perspective view of the device of the invention showing it securing a number of articles.

Reference is made to FIG. 1 wherein a plurality of irregularly shaped articles 10, such as bags packed with grocery articles, boxes, and bottles, are shown on a pallet or platform 11 and secured thereon by a net 12. The net is anchored to the rear edge of the pallet and drawn tightly over the articles and held in the taut condition by engaging the meshes of the net on hook-like elements on the front edge of the pallet. The weight of the articles on the pallet will generally keep the pallet from sliding on the floor of the trunk of the vehicle, or off the rear seat of the vehicle when placed thereon.

The pallet may be formed of any material, e.g., wood, aluminum, or plastic, and it may be a plane surface or grid-like as shown. The hook-like elements 13 may simply be extensions of the cross bars 14 forward of pallet rail 15 or they may be deflected upwardly as shown so that they are spaced farther above the floor or seat on which pallet 11 is placed and so facilitate the hooking of the meshes of net 12 thereunder. Alternatively, they may be forwardly projecting elements extending outwardly from rail 15, e.g., a series of spaced apart screws running the length of rail 15. In such case it is desirable to make front rail 15 thicker or deeper, as shown, than rear rail 16 so that the front end of pallet 11 is raised a greater distance from the seat or floor than the rear end, again to facilitate hooking of the net meshes to the front end of the pallet. The hook-like elements may simply be protuberances over which the meshes of net 12 are fitted or they may be shaped to more positively hold the net.

Figure 2:
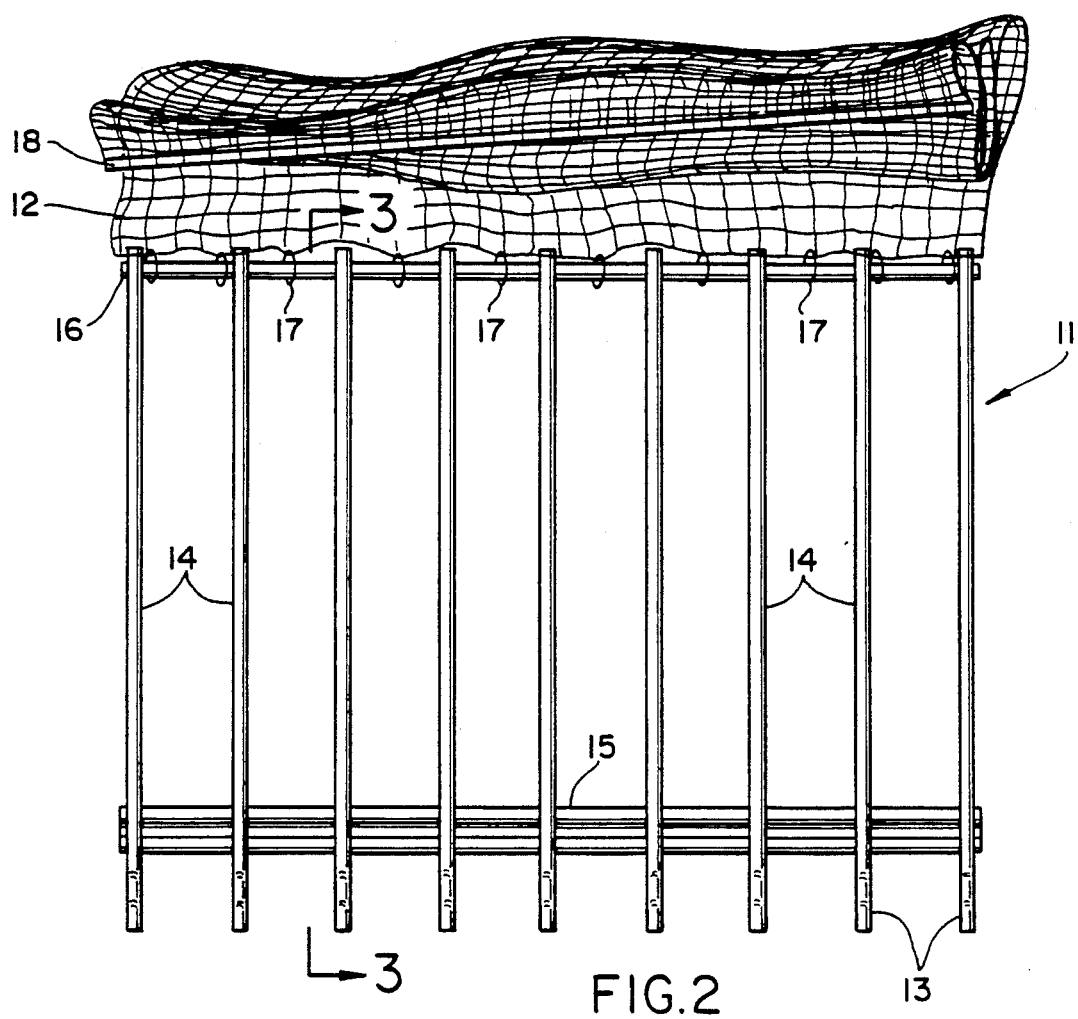
FIG. 2 is a plan view of the device with the net retracted to show the pallet.
Figure 3:
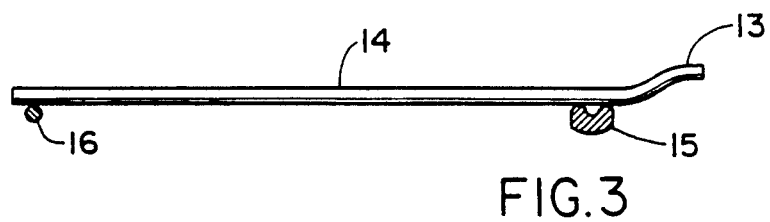
FIG. 3 is a view taken along line 3—3 of FIG. 2.

In FIG. 2, pallet 11 is shown as comprising two rails, front rail 15 and rear rail 16, and a series of connecting bars 14. The spacing between connecting bars 14 will generally be close enough so that articles will rest on the pallet, but even if an article fits between two adjacent connecting bars so as to rest on the support surface on which the pallet is placed, the article will be secured against inadvertent movement when net 12 is drawn tightly over all of the articles placed on the pallet and hooked on elements 13. The net is anchored to rear rail 16 by any suitable clamping or fastening members that will secure or anchor net to pallet 11. Split rings 17 are shown, but staples in the case of a wooden pallet, or a rope or cord lashing net 12 to rail 16 would be satisfactory. Other type clamps or fasteners would also be satisfactory.

The net 12 will generally be as wide as pallet rail 16 is long and considerably longer than the length of connecting bars 14. The length of the net will enable it to be draped over articles placed on pallet 11 and reach the front rail 15 where meshes of the net will be hooked over elements 13. Since it is the engagement of meshes of net 12 with elements 13 that holds the net taut over articles placed on pallet 11, and part of the net can be so engaged to accommodate any configuration of articles on pallet 11. For example, near the end connecting bars, net 12 may be pulled taut so that those parts of the net are flat on pallet 11 and meshes spaced from the the front edge of the net hooked on elements 13 while the central part of the net may be draped over several articles so that near this part of the pallet meshes at or near the front edge of the net are hooked on elements 13. Net 12 may be formed of nylon, or any other suitable material. To enable a user to grab the front edge of net 12, a dowel or rod 18 may be provided along the front edge of the net. Rod 18 would not be used to hook the front edge of the net, but simply to grasp the front edge of the net and drape the net over the load to be secured, after which the net would be pulled taut over the load and the appropriate meshes hooked on elements 13.

Figure 4:
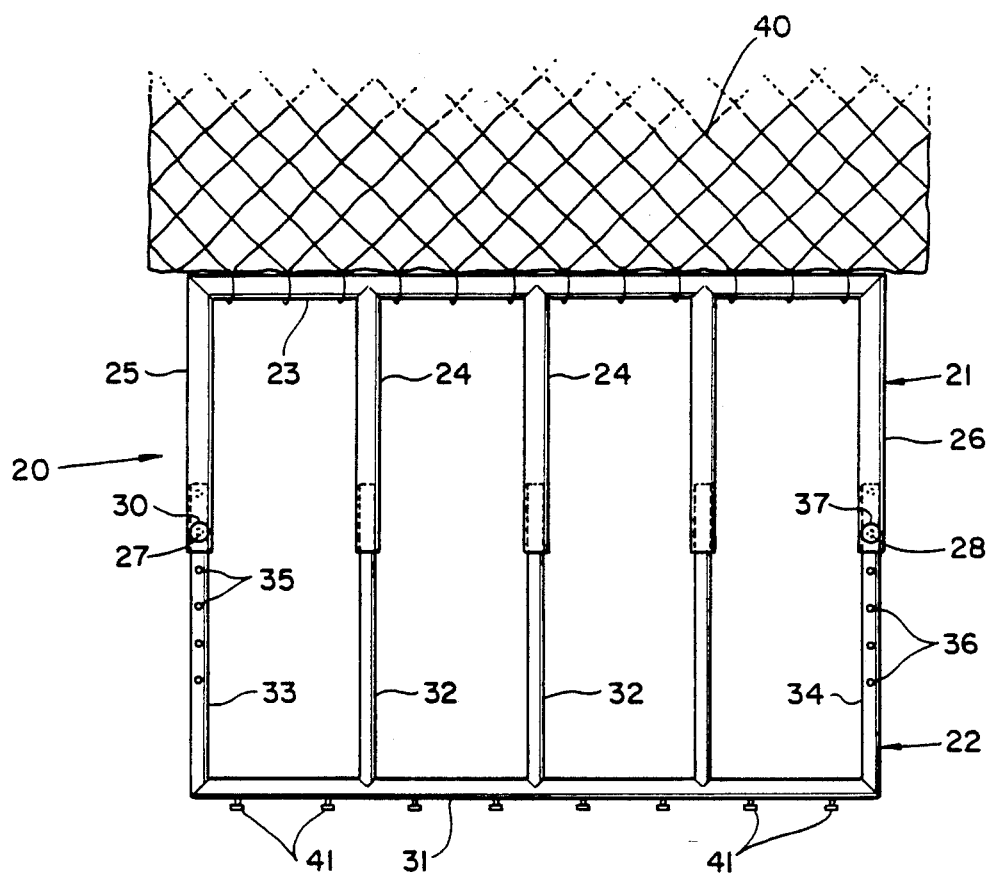
FIG. 4 is a view similar to FIG. 2 but showing a device having an adjustable size pallet.
Figure 5:
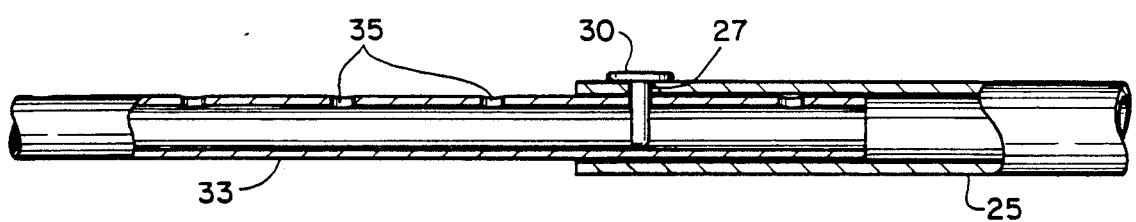
FIG. 5 is a fragmentary view showing the details for securing the pallet of FIG. 4 in an adjusted position.

FIG. 4 shows an embodiment of the invention in which the pallet width may be adjusted so that the device might be adapted to the place where it is used. For example, a narrower pallet might be preferred when it is placed on the rear seat of a vehicle rather than in the trunk. In this embodiment, pallet 20 comprises two parts 21 and 22. The rear part 21 includes a rear rail 23 formed of aluminum tubing and similarly formed connecting bar segments 24 which extend forwardly from rail 23. The end segments 25 and 26 are each provided near their forward ends with apertures 27, 28 into which locking pins 30 may be inserted. The front part 22 of pallet 20 includes a front rail 31 provided with rearwardly extending connecting bar segments 32 that telescope into segments 24. The end segments 33 and 34, which telescope into segments 25 and 26, are provided with a series of spaced apertures 35 and 36, respectively. The arrangement is such that when segments 32, 33, and 34 telecope into segments 24, 25, and 26, respectively, the width of pallet can under considerable adjustment. Locking pins 30, 37 inserted through apertures 27, 28 and into one of apertures 35, 36 will hold the two parts 21, 22 of pallet 20 in the adjusted position. While pallet 20 differs somewhat from pallet 11, it is clear that the connecting bars 14 could be made to telescope so that pallet 11 would then also be adjustable in width.

Net 40 is anchored to rear rail 23 by any suitable fastening means. After net 40 is pulled taut over articles placed on pallet 20, its meshes will be hooked over elements 41 provided along rail 31. These may be clips or simply screws partially threaded into rail 31 so that the screwheads serve to engage the meshes of net 40.

Figure 6:
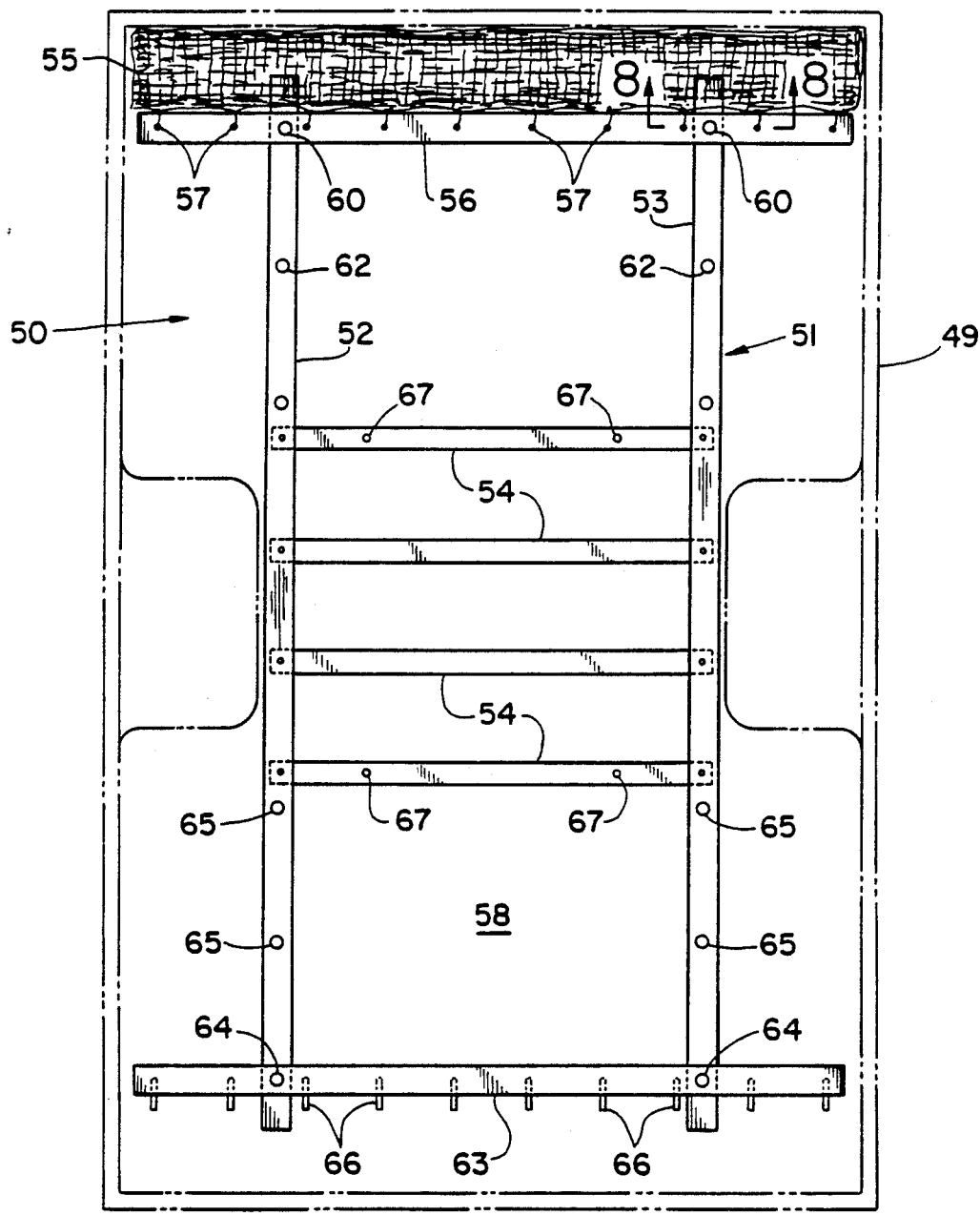
FIG. 6 is a plan view of another embodiment of the invention especially suitable for use on a pick-up truck.
Figure 7:
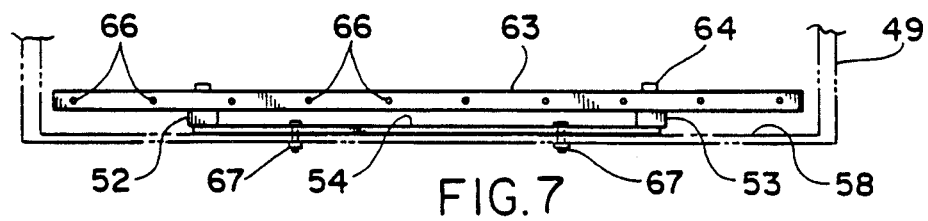
FIG. 7 is a front elevational view, With parts broken away, of the FIG. 6 embodiment.
Figure 8:
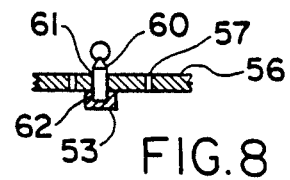
FIG. 8 is a sectional view taken along line 8—8 of FIG. 6.

An embodiment of a load securing device 50 especially suited for use on pick-up trucks 49 is shown in FIGS. 6, 7, and 8. Here, the pallet 51 is formed of two longitudinal rails 52 and 53 joined by a series of cross bars 54. The cross bars are positioned under rails 52, 53 so that they rest on the floor or deck of the truck. When so arranged, there is no need to make them rigid enough to carry heavy loads without deflection or bending as would be the case if they were positioned above rails 52, 53 and thus spaced above the floor or deck of the truck. In fact, only two cross bars, one near each end of rails 52 and 53, need be provided. In such case, pallet 51 is not truly a pallet in the load carrying sense, but rather serves as a frame for holding net 55. The floor of the truck is the load carrying platform and pallet or frame 51 and net 55 become a device for restraining the load carried by the truck.

The net 55 is anchored to net anchroing member 56 which extends essentially the full width of the truck floor. The end of net 55 may be clamped to member 56 by a bar clamp screwed on to member 56 or it may be fastened to member 56 by split rings, ties, or other fastening means passing through the net and apertures 57 provided in member 56.

Member 56 may be positioned along rails 52 and 53 and maintained in position by a detent pin or threaded bolt 60 passing through an aperture 61 provided in member 56 and into one of several spaced apertures 62, threaded or not as required, provided along rails 52 and 53.

A second member 63 for securing the free end of net 55 will be provided at the end of rails 52 and 53 remote from member 56. Second member 63 will also be positionable along rails 52 and 53 and maintained in the desired position by pins or bolts 64 passing through apertures in member 63 and into an aperture 65 provided along the rails 52 and 53. Second member 63 will be provided along its length with a series of hook-like elements 66 which are adapted to engage meshes of net 55 when the net is pulled taut over a load of articles placed on the floor of the truck. The elements 66 may be bolts partially threaded into member 63 so that the bolt heads are spaced from the member and serve to engage or hook meshes of net 55.

It is clear that when device 50 is placed on the floor of a truck and several articles loaded onto the truck, net 55 can be tightly drawn over the articles and hooked onto elements 66 provided on second member 63 thereby preventing any inadvertent shifting of the load when being transported. As a security measure, to prevent easy removal of device 50 from a truck, the device may be bolted to the floor or deck of truck 49 by bolts 67 passing through one or more of cross bars 54. If pallet 51 is only a frame serving to support members 56 and 63 and not a load carrying platform, or if members 56 and 63 serve as the end cross bars of a frame-like pallet, the weight of the pallet could be made such so as to inhibit its sliding around on the floor of the truck, or it could be dimensioned to just fit within confining walls of the truck, or it could be bolted to the floor of the truck. The latter arrangement also provides the security feature mentioned above.

Having thus described the invention, it is clear that many variations and embodiments could be made without departing from the spirit and scope of the invention. Therefore, it is intended that the foregoing specification and the accompanying drawing are to be interpreted as illustrative and not in a limiting sense.

What is claimed is:

1. A portable device for securing loads, in motor vehicles comprising, generally rectangular platform means having a length defined by a rear edge and a front edge spaced therefrom, said front edge of said platform means being provided along its width with a series of spaced apart hook-like elements over which meshes of a net may be hooked, net means having a rear edge and a front edge, the length of said net means from said rear edge to said front edge being greater than the spacing between said rear and front edges of said platform means, said net means having a width substantially equal to the width of said platform means, and anchoring means irrremovably attaching said rear edge of said net means to said rear edge of said platform means, the arrangement being such that said net means can be draped over a load placed on said platform means, pulled taut to restrain the load, and secured in the restraining position by engaging meshes of of said net means with said hook-like elements provided along the front edge of said platform means.

2. A portable load securing device according to claim 1 wherein said platform means comprises a rear rail, a front rail parallel thereto and spaced therefrom, and at least two connecting bars joining said rails substantially near their ends, wherein said hook-like elements are provided along said front rail, and wherein said anchoring means attaches said net means to said rear rail.

3. A portable load securing device according to claim 1 wherein said platform means comprises a rear rail, a front rail parallel thereto and spaced therefrom, and a plurality of connecting bars joining said rails, wherein said hook-like elements are portions of said connecting bars extending past said front rail.

4. A portable load securing device according to claim 3 wherein said front rail has a greater height than said rear rail so as to lift the front edge of said platform means a greater distance above the surface on which said device is spaced than the rear edge of said platform means.

5. A portable load securing device according to claim 3 wherein each cross bar comprises two segments, one of which telescopes into the other so that the distance between said rear and front rails may be adjusted.

6. A portable load securing device according to claim 5 including locking means to secure said cross bars in their adjusted position.

7. A portable load securing device according to claim 1 including rod means provided along the front edge of said net means to facilitate grasping and pulling the front edge of said net means over a load to be secured on said platform means.

8. A device for securing loads to the floor of a truck, said device comprising a first rail and a second parallel rail spaced therefrom, each of said rails having opposite ends, at least a first cross bar and a second cross bar for joining said rails to form a unitary structure, a net anchoring member connected to one end of each of said rails, a net securing member connected to the other end of each of said rails, said net securing member being provided along its length with a series of spaced apart hook-like elements, net means having a width substantially equal to the length of said net securing member and a length from end to end sufficient to reach from said anchoring member to said securing member when draped over a load placed between said anchoring and securing members, and anchoring means for irremovably attaching one end of said net means to said net anchoring member, the arrangement being such that meshes of said net means can be hooked on said hook-like elements on said net securing member when said net means is pulled taut over a load placed between said net anchoring and securing members.

9. A device for securing loads according to claim 8 wherein at least one of said net anchoring and securing members is adjustably positionable along the length of said rails.

10. A device for securing loads according to claim 8 including rod means provided along the non-anchored end of said net means to facilitate grasping and pulling said end of said net means over a load to be secured between said net anchoring and securing members.

* * * * *